Figure 2A:
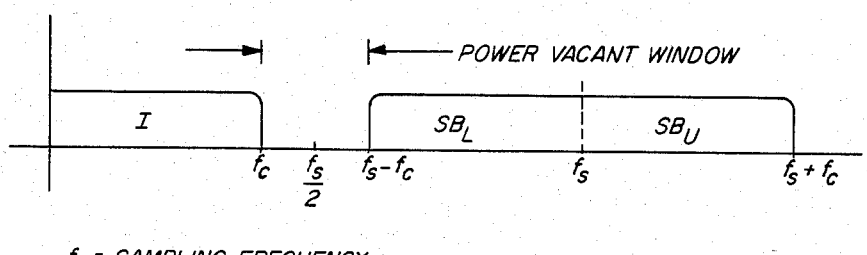

United States Patent [19]

Fearnside

[11] Patent Number: 4,535,359
[45] Date of Patent: Aug. 13, 1985

[54] DEFECT CORRECTION IN SOLID STATE IMAGING

[75] Inventor: William T. Fearnside, Fishers, N.Y.

[73] Assignee: Eastman Kodak Company, Rochester, N.Y.

[21] Appl. No.: 458,497

[22] Filed: Jan. 17, 1983

[51] Int. Cl.³ .......................... H04N 5/14; H04N 3/14
[52] U.S. Cl. .................................... 358/163; 358/213; 358/225
[58] Field of Search .................. 358/163, 213, 212, 44, 358/225, 167

[56] References Cited

U.S. PATENT DOCUMENTS

| | | | |
|---|---|---|---|
| 3,962,681 | 6/1976 | Requa et al. | 382/67 |
| 3,975,760 | 8/1976 | Yamanaka et al. | 358/50 |
| 4,001,501 | 1/1977 | Weimer | 358/160 |
| 4,101,929 | 7/1978 | Ohneda et al. | 358/44 |
| 4,189,751 | 2/1980 | Nagumo | 358/213 |
| 4,193,093 | 3/1980 | St. Clair | 358/160 |
| 4,220,971 | 9/1980 | Lambeth | 358/160 |
| 4,228,468 | 10/1980 | Nagano et al. | 358/280 |
| 4,253,120 | 2/1981 | Levine | 358/213 |
| 4,356,507 | 10/1982 | Goldberg et al. | 358/167 |

OTHER PUBLICATIONS

"Charge Transfer Devices" by Séquin et al. (1975), pp. 173-175.
"Television Technology in the 80's" by A. A. Goldberg and J. P. Rossi, pp. 80-88, presented at the SMPTE Conference held Feb. 6-7, 1981.

*Primary Examiner*—Tommy P. Chin
*Assistant Examiner*—Michael D. Parker
*Attorney, Agent, or Firm*—Raymond L. Owens

[57] ABSTRACT

The base bandwidth of any optical image that falls upon an imager is customized so that its uppermost spatial frequency is less than half the sampling frequency associated with the imager, thereby creating a power-vacant frequency window in the signal output of the imager. Since the edges of dead and hot pixels correspond with very high spatial frequency components, the very existence of a dead or hot pixel will result in signal power within the aforementioned window of the sampled output of the imager . . . and the extent of such power will be directly dependent on the magnitude of the discrete optical image that falls in the vicinity of the dead or hot pixel. Apparatus according to the invention detects the existence of power at a frequency of one-half the imager sampling frequency (i.e. at the center of the aforenoted power-vacant window); thereafter, such power is transformed into a correction signal for properly timed algebraic addition to the baseband signal output of the imager.

7 Claims, 6 Drawing Figures

FIG. 1a
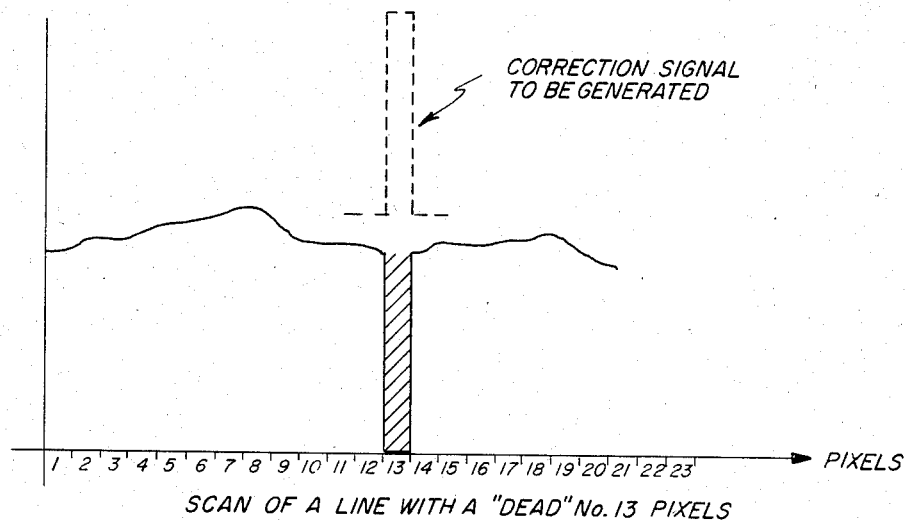
SCAN OF A LINE WITH A "DEAD" No. 13 PIXELS
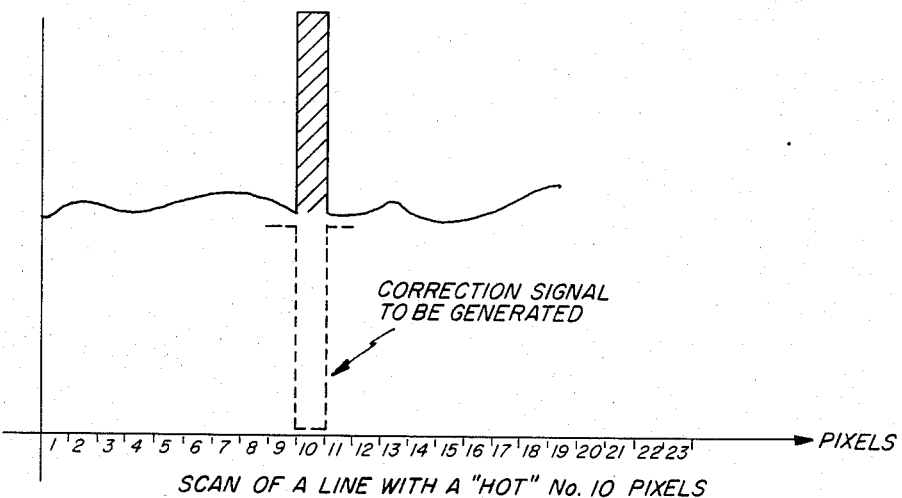
SCAN OF A LINE WITH A "HOT" No. 10 PIXELS
FIG. 1b $f_S$ = SAMPLING FREQUENCY $f_S$ = SAMPLING FREQUENCY

DEFECT CORRECTION IN SOLID STATE IMAGING

BACKGROUND OF THE INVENTION

1. Field of the Invention

This invention relates in general to electronic imaging and in particular to a technique for identifying and/or correcting for defects in a solid state imager.

2. Description Relative to the Prior Art

Solid state imaging, such as by means of a charge coupled device (CCD), has found wide acceptance in the video arts for a variety of reasons, among which are lower power consumption, higher sensitivity, and potential cost saving as the technology for producing such devices matures. A typical CCD imager, as representative of the general class of imagers in question, comprises an array of a large number of evenly distributed elemental photosensitive picture elements, i.e. pixels: the greater the number of pixels per imager, the greater the image resolution of the imager. While there is a trend toward employing more and more pixels per imager for image resolution purposes, it is recognized that the greater the number of pixels that an imager has, the greater will be the chance that one or more of the pixels will be bad, thereby possibly rendering the imager useless. Two kinds of pixel defects are generally known to exist in a solid state imager: a "dead" pixel in which little or no image representative photocharge can exist; and a "hot" pixel in which too much photocharge gets accumulated due, for example, to electrical dark current leakage at the pixel. Thus, despite the trend toward more and more pixels per imager, practical design considerations often militate against using more pixels per imager than are absolutely necessary.

Various relatively straightforward techniques are known for obviating the effect of one or more defective pixels in a CCD imager. See, for example, U.S. Pat. No. 4,253,120, issued Feb. 24, 1981, which teaches that, if lower resolving optics for imaging onto a high resolution imager are employed, any given image spot will overlap more than one pixel; and, attendantly, when a pixel is bad, interpolation can be employed to obscure, in real time, the effect of such bad pixel. It is also known to memorize, by use, for example, of a read-only-memory (ROM), the locations of defective pixels of an imager, thereby to produce appropriate correction signals (typically signals corresponding to neutral gray) as substitutes for signals produced by dead and hot pixels ... this correction technique being, however, one that does not occur in real time. In any event, regardless of which of the aforementioned schemes are employed, correction for defective pixels is usually less than perfect. The latter scheme merely works to dull the effect of a defective pixel; and the former works in a way that, in essence, guesses at what occurs between pixels.

Other art which may be of interest in relation to the present invention may be found in an article from "Television Technology in the 80's" by A. A. Goldberg and J. P. Rossi, pp. 80–88 presented at the SMPTE Conference held Feb. 6-7, 1981.

SUMMARY OF THE INVENTION

In accordance with the present invention, correction for a defective pixel occurs in real time and in an amount precisely dependent on the discrete optical image signal applied to the defective pixel. To this end, the invention draws on principles outlined by Nyquist, viz. that—to avoid signal intermodulation and image aliasing—it is essential when sampling a baseband video signal to sample at least twice the uppermost frequency within the base-band signal. As is known, when sampling in this manner, a power-vacant window will occur in the frequency spectrum between the uppermost frequency of the baseband signal and the lowermost frequency of the lower sideband of the sample-modulated signal. Pursuant to the invention, the base bandwidth of any optical image that falls upon an imager is customized so that its uppermost spatial frequency is less than half the sampling frequency associated with the imager, thereby creating a power-vacant frequency window in the signal output of the imager. Since the edges of dead and hot pixels correspond with very high spatial frequency components, the very existence of a dead or hot pixel will result in signal power within the aforementioned window of the sampled output of the imager . . . and the extent of such power will be directly dependent on the magnitude of the discrete optical image that falls in the vicinity of the dead or hot pixel.

For convenience, apparatus according to the invention detects the exsistence of power at a frequency of one-half the imager sampling frequency (i.e. at the center of the aforenoted power-vacant window); thereafter, such power is transformed into a correction signal for properly timed algebraic addition to the baseband signal output of the imager.

Two distinct advantages are provided by the practice outlined above:

(a) Rather than work sensor design to employ just enough pixels for a given application, the density of pixels may be as large as possible, the optical bandwidth being qualified to negate the effect of any bad pixels, should they exist. In this way, perfect imagers with high densities of pixels can be saved for special applicatons; and less than perfect—but otherwise high density—imagers can be employed as would imagers of lower resolution.

(b) Sensors, heretofore considered as scrap because of bad pixels, may be salvaged for use in lower cost apparatus by appropriately qualifying the optics associated with such sensors.

Figure 2B:
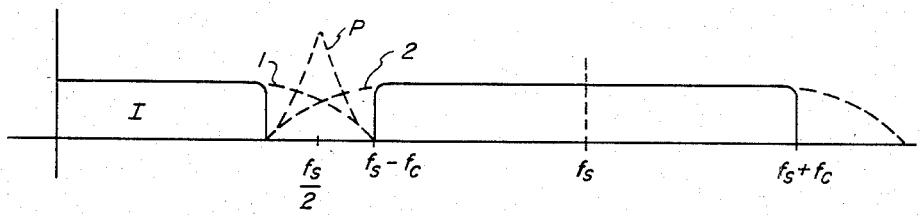
Figure 3:
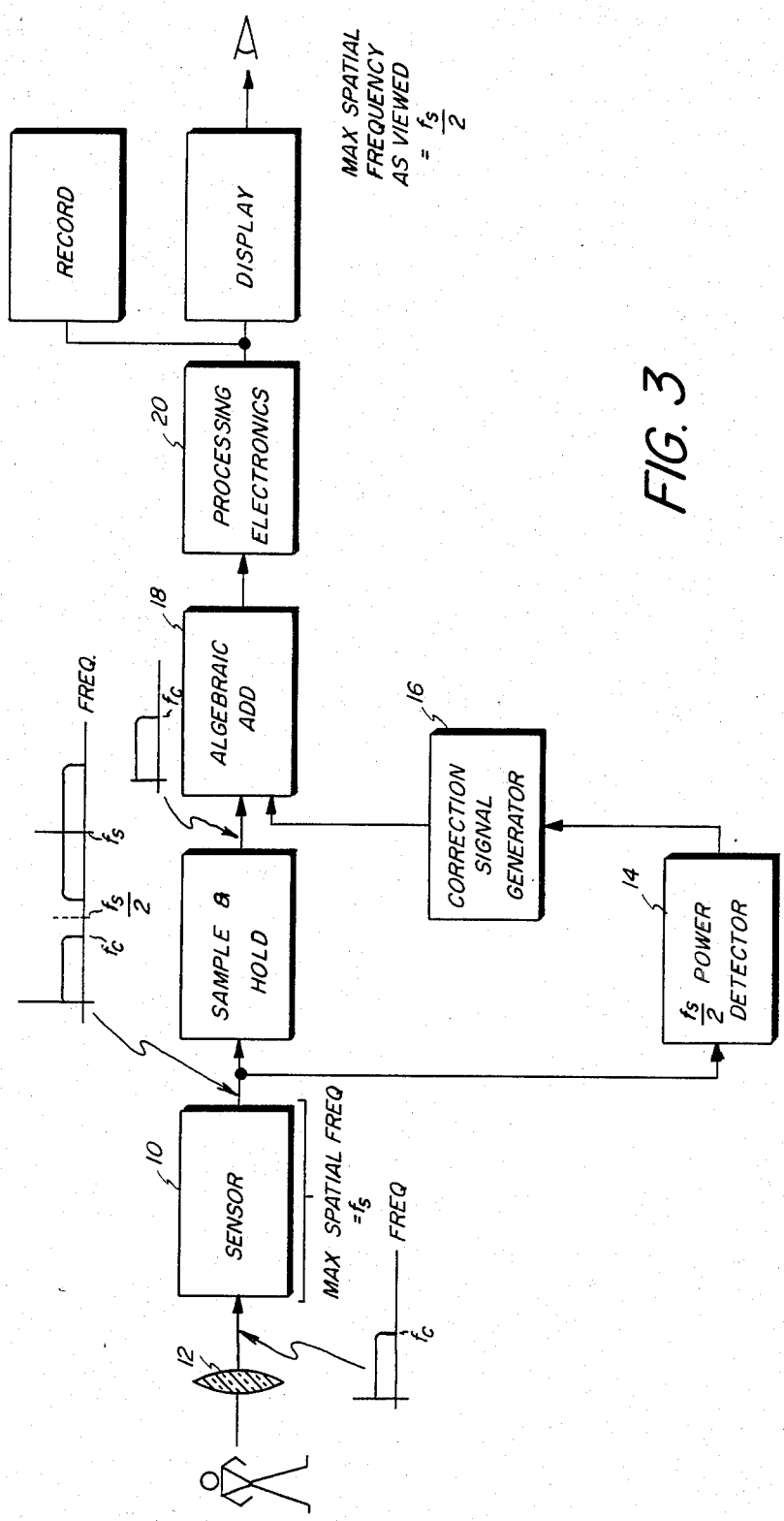
Figure 4:
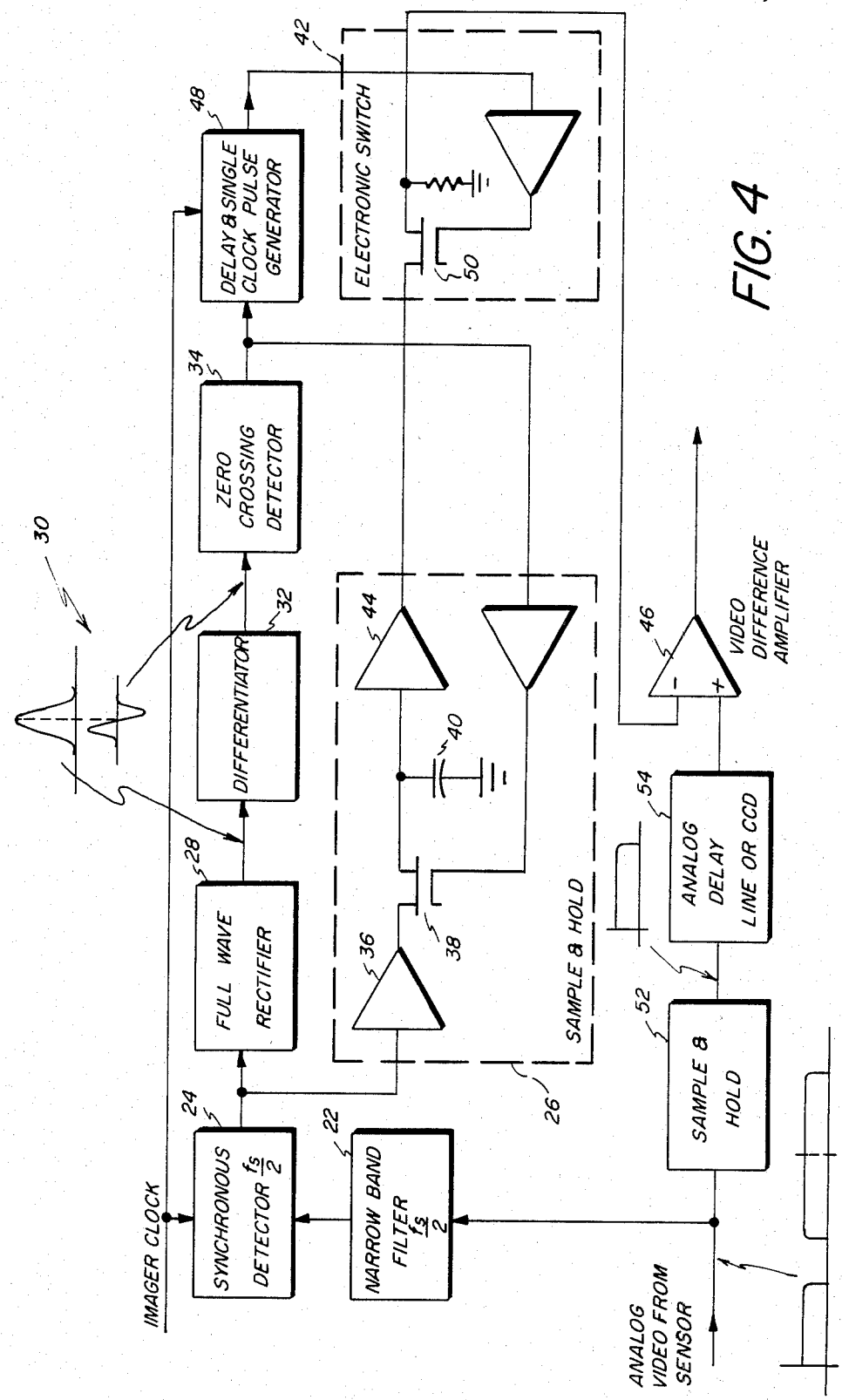

With the above as background, reference should now be had to the figures identified below, and to the accompanying detailed description of the invention in its presently preferred form:

FIG. 1a and FIG. 1b are diagrams that illustrate analog signals corresponding to the scanning of a line of an imager in which, respectively, there is a dead pixel and in which there is a hot pixel, FIG. 2a is a diagram that illustrates the bandwidth of a scanned imager adapted to accommodate the invention, and Fig. 2b is a diagram that illustrates what occurs to the bandwidth of FIG. 2a when the scanning operation encounters a bad pixel, FIG. 3 is a schematic block diagram illustrating apparatus according to the teaching of the invention, and FIG. 4 is a schematic diagram illustrating a presently preferred implementation of the invention.

Referring to FIG. 1a, the kind of analog signal waveform resulting from scanning the samples of a line of pixels of a solid state imager is depicted—there being, by way of example, a dead #13 pixel in the line. Similarly, in FIG. 1b, the kind of analog signal waveform resulting from scanning the samples of a line of pixels in which one of the pixels (#10) is a hot pixel is depicted.

Needless to say, were the signal waveform of either FIG. 1a or FIG. 1b to be converted to its corresponding visual display, the display in question would be faulty . . . either because of a pinpoint dark spot (FIG. 1a), or a pinpoint bright spot (FIG. 1b), along the displayed line. Whereas the pinpoint dark spot defect is a bit objectionable, a pinpoint bright spot is especially bad because it appears as a highlight. It will be appreciated further that in the event—and as may often be the case—successive analog line signals all have dead, or hot, similarly numbered pixels, vertical dark or bright lines will appear in the corresponding video display; and, in this case, a dark line may be as objectionable as a bright one.

In accordance with the practice of the invention, correction signals for properly timed algebraic addition to the analog signals are artificially produced. Thus, in the case of a FIG. 1a kind of defect, the produced correction signal will serve to "fill in" the cross-hatched part of the FIG. 1a analog signal; in the case, however, of a FIG. 1b type defect, the correction signal will serve to cancel the effect of the cross-hatched part of the FIG. 1b analog signal.

FIG. 2a depicts the spatial frequency baseband I of an optical image customized according to the invention . . . which is to say that the optical spatial frequency cutoff $f_c$ is less than one-half the sampling frequency $f_s$ effected by means of the imager in question. Note the power-vacant window that exists between the lower sideband $SB_L$ and the baseband I. ("$SB_U$" stands for "upper sideband".) Given the existence of a dead or hot imager pixel, high frequency signal components greater than $f_c$ are generated as the dead or hot pixel is read during sampling. Attendantly, the upper frequency edge on the baseband signal shifts (see dashed line 1) toward the frequency $(f_s-f_c)$; and, corollarily, significant signal power (dotted line P) suddenly appears in the window as the lower sideband $SB_L$ reaches toward the baseband signal I (see dashed line 2). As will be appreciated, the phase of the signal at $f_s/2$ will depend on whether a dead or hot pixel had been encountered during sampling, i.e. whether the leading and trailing edges of the FIG. 1a and FIG. 1b cross-hatched signal aberrations were "down-and-then-up", or "up-and-then-down". In accordance with the invention, use is made of this phase characteristic to discern the direction of correction to be effected for a bad imager pixel.

Reference should now be had to FIG. 3 for a general arrangement of apparatus for implementing the invention: Given that a sensor 10 has a distribution of pixels which is such that an image received thereby gets sampled by the imager at a frequency $f_s$, the invention calls for optics 12 to limit the optical spatial frequency bandpass to less than the frequency $f_s/2$, whereby the imager-and-optics assembly will operate pursuant to the teaching of Nyquist. Note the baseband optical frequency spectrum applied to the sensor 10; and the "windowed" electrical frequency spectrum exiting the sensor 10. In the event signal power, of frequency $f_s/2$, exists at the sensor 10 output (evidencing a "defect" associated with the baseband signal), such power is detected by a detector 14 . . . which in response thereto causes a correction signal generator 16 to produce a correction signal for algebraic addition (18) to the baseband signal . . . such baseband signal being produced by a sample-and-hold operation on the signal appearing at the output of the sensor 10. Correction signals are as depicted in phantom in FIGS. 1a, 1b; and may be produced in a manner described later in connection with the apparatus of FIG. 4. It suffices to say at this point, however, that the correction signals are proportioned according to the peak power occuring at the frequency $f_s/2$ and, attendantly, precisely compensate for any signal distortion effected by a bad pixel. (In other words, the height of the signal rise, or the depth of the signal decline, at the occurrence of a defective pixel is determined and employed to correct for the occurrence.) The output of the adder 18 may then be processed (20), say, into the NTSC signal format for display on a television set, or processed into a suitable form for recording on a magnetic medium or the like.

With the above as background, consideration should now be given to the circuit of FIG. 4: The analog video signal produced by the sensor 10 is applied to a narrow band filter 22 tuned to the frequency $f_s/2$ which occurs at the center of what should be a power-vacant window in the spectrum of the sensor output. In the event signal power exists in the spectrum window, such power is synchronously detected by a detector 24, which may be of any wellknown type. Synchronous detection is employed in this instance, as noted above, so that the phase characteristic of the defect-identifying $f_s/2$ power may be discerned . . . and whereby the proper direction of correction may be implemented. Thus, appearing at the output of the detector 24 will be a pulsating signal of one polarity for the signal correction indicated according to the showing of FIG. 1a . . . or a pulsating signal of the opposite polarity for the signal correction indicated according to the showing of FIG. 1b. The polarized output of the synchronous detector 24 is applied to a sample-and-hold circuit 26 and to a full-wave rectifier 28, the latter serving to produce a signal 30 (irrespective of the polarity of the signal applied to the full-wave rectifier), and the former serving to capture the peak amplitude of the high frequency pulses produced by the synchronous detector 24. The rectified signal 30 is differentiated by a circuit 32 to produce a signal that "zero-crosses" at the instant peak power exists in the spectrum window, thereby identifying the particular high frequency pulse output of the synchronous detector 24 which is to serve for precise signal correction.

The output of the differentiator 32 is applied to a zero-crossing detector 34 (which may for example be a comparison circuit referenced to zero volts) and, at the instant the peak of the power signal applied to the differentiator 32 occurs, the zero-crossing detector 34 pulses the sample-and-hold circuit 26. Attendantly, a high speed, high current FET input buffer 36 (e.g. an LH0032 amplifier) samples the polarized high frequency pulsed output of the synchronous detector 24 (at the occurrence of the peak pulse thereof); and this sampled pulse is gated (38) for "holding" by a capacitor 40. Having identified the proper correction signal, i.e. the sampled signal, signal correction is effected by switching (42) the correction signal via a high speed, high current FET buffer amplifier 44 (e.g. LH0032) to a video difference amplifier 46. Since the baseband defect to be corrected will inherently correspond with the duration of a single pixel during the scanning thereof, a single clock pulse generator 48 is employed to turn on a gating FET 50 (e.g. an SD211 gate) for the scan duration of a single pixel.

As indicated above in connection with FIG. 3, the windowed signal spectrum appearing at the output of the sensor is sampled and held (52) to recover the baseband signal; and by means of a delay device 54, which compensates for the signal delay associated with the circuit components 22–50, the baseband signal is applied to the difference amplifier 46. There, it is algebraically added to the correction signal to provide the baseband signal with the form it would have had were the sensor in question to have been perfect in the first place.

The invention has been described in detail with particular reference to preferred embodiments thereof, but it will be understood that variations and modifications can be effected within the spirit and scope of the invention.

What is claimed is:

1. Apparatus for use with an electrooptic imager adapted to receive and sample an optical image at a given sampling frequency, thereby to produce a composite signal comprised of a baseband signal and sidebands of said sampling frequency, comprising:
   (a) means for limiting the optical spatial frequency bandwidth of any optical image cast upon said imager to a frequency that is less than one-half the sampling frequency of said imager,
   (b) means for receiving said composite signal for detecting electrical power having a frequency that approximates or equals one-half said sampling frequency, thereby to register the existence of at least one defective pixel of said imager, and
   (c) means for modifying said baseband signal in proportion to the magnitude of said electrical power and in accordance with the phase thereof.

2. The apparatus of claim 1, wherein said means for detecting electrical power is comprised of:
   (a) narrow band filter means tuned to one-half said sampling frequency, and
   (b) a detector responsive to the output of said narrow band filter means.

3. The apparatus of claim 2, wherein said detector is a synchronous detector, whereby the output thereof will have a polarity dependent on the phase of said electrical power, and whereby said polarity will be correlative of whether said defective pixel is a dead or a hot pixel.

4. The apparatus of claim 3, further comprising:
   (a) full wave rectifier means for receiving the polarized output of said synchronous detector for producing therefrom a pulsed signal having a given polarity regardless of the phase of said electrical power, and
   (b) differentiating means adapted to receive the output of said full wave rectifier means for differentiating said output to produce a timing signal for controlling the time of modification of said baseband signal.

5. The apparatus of claim 1, wherein said electrooptic imager is a charge coupled device.

6. Electrooptical apparatus comprising:
   (a) image sensor means comprised of pixels for receiving an optical image and for sampling that image at a predetermined frequency to produce an electrical signal corresponding to such image, said electrical signal being, by virtue of said sampling, comprised of a baseband image signal and sidebands of said sampling frequency,
   (b) optical means for imaging upon said image sensor means, said optical means being of a type having an optical spatial frequency bandpass which is such that said baseband signal has a cutoff frequency that is less than one-half said predetermined sampling frequency,
   (c) means adapted to receive said electrical signal for detecting electrical power at a frequency approximately one-half said predetermined sampling frequency, thereby to register the existence of a defective pixel of said image sensor means,
   (d) means adapted to receive said electrical power signal for producing an electrical correction signal corresponding to the magnitude and phase of said power signal,
   (e) means for isolating the baseband signal component of said electrical image signal, and
   (f) means for modifying said isolated baseband signal by means of said correction signal, thereby to cause said baseband signal to have a form corresponding to that which it would have had if a power-producing defective pixel had not existed in said sensor means.

7. The apparatus of claim 6, wherein said means for detecting electrical power is adapted to detect electrical power having a frequency of precisely one-half said predetermined sampling frequency.

* * * * *